US007767000B1

(12) United States Patent
Siriwardane (10) Patent No.: US 7,767,000 B1
(45) Date of Patent: Aug. 3, 2010

(54) REGENERABLE HYDROGEN CHLORIDE REMOVAL SORBENT AND REGENERABLE MULTI-FUNCTIONAL HYDROGEN SULFIDE AND HYDROGEN CHLORIDE REMOVAL SORBENT FOR HIGH TEMPERATURE GAS STREAMS

(75) Inventor: Ranjani Siriwardane, Morgantown, WV (US)

(73) Assignee: The United States of America as represented by the United States Department of Energy, Washignton, DC (US)

( * ) Notice: Subject to any disclaimer, the term of this patent is extended or adjusted under 35 U.S.C. 154(b) by 217 days.

(21) Appl. No.: 11/951,608

(22) Filed: Dec. 6, 2007

Related U.S. Application Data

(60) Provisional application No. 60/908,697, filed on Mar. 29, 2007.

(51) Int. Cl.
*B01D 53/14* (2006.01)
(52) U.S. Cl. .............................. 95/132; 95/90; 502/400
(58) Field of Classification Search .................... 95/90, 95/132; 502/400
See application file for complete search history.

(56) References Cited

U.S. PATENT DOCUMENTS

| | | | | |
|---|---|---|---|---|
| 3,101,253 A * | 8/1963 | Hirschberg | ................. | 423/478 |
| 3,492,083 A * | 1/1970 | Lowicki et al. | ........ | 423/243.11 |
| 3,589,863 A * | 6/1971 | Fredvel et al. | .............. | 423/540 |
| 4,002,717 A * | 1/1977 | Sandberg et al. | .............. | 423/24 |
| 4,026,773 A * | 5/1977 | Van Peteghem | ............. | 205/581 |
| 4,039,623 A * | 8/1977 | Lavanish et al. | ......... | 423/240 S |
| 4,045,538 A * | 8/1977 | Sare et al. | ............... | 423/240 R |
| 4,106,928 A * | 8/1978 | Harvey et al. | ................. | 75/676 |
| 4,151,739 A * | 5/1979 | Breuer et al. | ................ | 73/1.06 |
| 4,271,133 A * | 6/1981 | Tellis | ......................... | 423/230 |
| 5,154,911 A * | 10/1992 | Benson et al. | ............. | 423/502 |
| 5,232,490 A * | 8/1993 | Bender et al. | ................. | 75/733 |
| 5,869,009 A * | 2/1999 | Bellefeuille et al. | ......... | 422/171 |
| 6,080,281 A * | 6/2000 | Attia | ....................... | 204/157.3 |
| 6,146,451 A * | 11/2000 | Sakata et al. | ................... | 96/135 |
| 6,197,275 B1* | 3/2001 | Hagemeyer et al. | ......... | 423/502 |
| 6,203,596 B1* | 3/2001 | Von Gemmingen | ............ | 95/42 |
| 6,214,089 B1* | 4/2001 | Li et al. | ......................... | 95/45 |
| 6,331,351 B1* | 12/2001 | Waters et al. | ............. | 428/317.7 |
| 6,432,177 B1* | 8/2002 | Dallas et al. | .................. | 96/132 |
| 7,364,603 B2* | 4/2008 | Sweeney et al. | .............. | 95/133 |
| 2002/0189457 A1* | 12/2002 | Dallas et al. | .................. | 96/132 |
| 2005/0061147 A1* | 3/2005 | Marganski et al. | ............ | 95/116 |

OTHER PUBLICATIONS

Unknown author, "Final Report: A Long-Life Low Cost Sorbent for the Conversion of HCl to Chlorine," U.S. Environmental Protection Agency, National Center for Environmental Research, published at http://cfpub.epa.gov/ncer_abstracts/index.cfm.

* cited by examiner

*Primary Examiner*—Robert J Hill, Jr.
*Assistant Examiner*—Christopher P Jones
(74) *Attorney, Agent, or Firm*—James B. Potts; Mark P. Dvorscak (57) ABSTRACT

A novel regenerable composition for removing hydrogen chloride and hydrogen sulfide from a gas stream, the sorbent comprising a mixture containing from about 5 wt % manganese oxide to about 99 wt. % manganese oxides where manganese can exist in various oxidation states.

16 Claims, 8 Drawing Sheets

HCL SORPTION TESTS WITH MANGANESE OXIDE SORBENT
HCl 150ppm 4 hrs, 3000 ppm 3.4 hrs at 315°C (600°F ), BED HEIGHT 6"

REGENERABLE HYDROGEN CHLORIDE REMOVAL SORBENT AND REGENERABLE MULTI-FUNCTIONAL HYDROGEN SULFIDE AND HYDROGEN CHLORIDE REMOVAL SORBENT FOR HIGH TEMPERATURE GAS STREAMS

This application claims priority from provisional patent application 60/908,697 filed on Mar. 29, 2007.

The United States Government has rights in this invention pursuant to the employer-employee relationship between the U.S. Government and the inventor in addition to other contractual agreements.

BACKGROUND OF THE INVENTION

1. Field of the Invention

This invention relates to a process and a device for the removal of contaminants from gas generated by the gasification of fossil fuels and, more particularly, this invention relates to a method and device for removal of HCl with a regenerable sorbent and simultaneous extraction of hydrogen chloride compounds and hydrogen sulfide from fuel gas.

2. Background of the Invention

A large number of components in coal and other carbon-base fuels form corrosive and toxic compounds during the gasification processes. Treatment systems for removal of these contaminants utilize wet or dry scrubbing systems wherein compounds are added to remove these corrosive or toxic compounds. According to estimates, contaminants have to be reduced to parts per million (ppm) range and preferably in the parts per billion (ppb) range in order to utilize gasification gas streams in many applications. Even more stringent requirements are expected if the fuel gas is to be utilized in chemical production applications. Hydrogen chloride and hydrogen sulfide are two corrosive compounds that need to be removed from the coal gas streams. In order to provide an economical process as well as an environmentally friendly process from the perspective of waste products generated, it would be preferable to use a regenerable sorbent. There are no regenerable warm/hot gas clean up sorbents that can remove the hydrogen chloride levels at warm gas temperatures. There are disposable sorbents for HCl removal. Disposal problems associated with disposable sorbents can be eliminated by developing a regenerable sorbent. The coal gas could be utilized in many applications such as fuel cells and chemical co-production if the hydrogen chloride in the gases could be removed to below 1 ppmV range while meeting future environmental regulations. So the product from this project will benefit industry.

There are no regenerable sorbents reported in the literature for HCl removal at warm (200°-450° C.) or hot gas temperatures (>450° C.). The re are no multi functional sorbents reported in the literature to remove both $H_2S$ and HCl simultaneously. Utilization of a multi-functional sorbent to remove both $H_2S$ and HCl simultaneously will minimize the number of steps involved in the process and contribute to lower cost of operation.

A need exists in the art to provide a method and process for the removal of HCl and $H_2S$ resulting from gasification of coal simultaneously and reuse the material for multiple cycles.

SUMMARY OF THE INVENTION

An object of the present invention is to provide a method and device for removing impurities such as HCl generated during coal gasification process that overcomes many of the disadvantages of the prior art.

These and other objectives of the invention, which will become apparent from the following description, have been achieved by a novel system for the sorption of HCl and $H_2S$. The process discussed herein for removing hydrogen chloride from a gas stream comprising, providing a first gas steam containing at least 5 ppm of hydrogen chloride; exposing the gas stream to a sorbent containing from about 5 wt. % to about 99.5 wt % manganese oxide; producing a second gas stream containing less hydrogen chloride than the first gas stream; and exhausting the second gas stream. Typically, the first gas stream is between about 200° C. and about 700° C. and preferably between about 315° C. and about 500° C. Further, the sorbent is regenerated by the process of increasing the temperature of the sorbent to greater than 500° C. and exposing the sorbent to a gas containing at least 2 wt. % oxygen for at least about 10 minutes. The process of simultaneous removal of hydrogen sulfide and hydrogen chloride providing the gas stream contains at least 5 ppm HCl and 5 ppm $H_2S$; exposing the gas stream to a sorbent containing from about 5 to 99.5 wt % manganese oxide.

A novel regenerable HCl removal sorbent is disclosed herein. There are disposable costs involved with non regenerable sorbents. This is a big advantage of the regenerable sorbents. The HCl removal capacity of the regenerable sorbent is comparable to those of the non-regenerable sorbents. The conditions for regeneration with oxygen are very similar to the conditions used for $H_2S$ removal used in coal gasification. So there will be no additional costs involved in the regeneration. The future goal of coal gasification systems is to utilize multi functional sorbents. Since the regeneration and absorption conditions are very similar for both sulfur and chloride removal sorbents it would be easier to design a multi functional system. The regenerable HCl sorbent that is described in this patent application can also remove $H_2S$ and can be regenerated using oxygen. Therefore, the sorbent can be utilized as a multi functional regenerable sorbent to remove both HCl and $H_2S$ simultaneously.

BRIEF DESCRIPTION OF THE SEVERAL VIEWS OF DRAWINGS

With this description of the invention, a detailed description follows with reference being made to the accompanying figures of drawings which form part of the specification, in which like parts are designated by the same reference numbers, and of which.

DETAILED DESCRIPTION OF THE INVENTION

As shown by the following discussion a regenerable sorbent has been identified for the absorption of either HCl or both HCl and $H_2S$. Manganese oxide has been identified as the regenerable sorbent for the removal of HCl and $H_2S$, as shown in the reactions listed below.

HCl Absorption Reaction:

$MnO + 2HCl \rightarrow MnCl_2 + H_2O$ (1)

Regeneration Reaction:

$2MnCl_2 + O_2 \rightarrow 2MnO + 2Cl_2$ (2)

$H_2S$ Absorption Reaction:

$MnO + H_2S \rightarrow MnS + H_2O$ (3)

Regeneration Reaction $2MnS + 3O_2 \rightarrow 2MnO + 2SO_2$ (4)

Manganese oxides in other oxidation states may also participate in the reaction. These include but not limited to $Mn_2O_3$ and $MnO_2$.

In the regeneration reaction of manganese chloride to form manganese oxide and chlorine as shown, it should be noted that reaction (2) has a negative Gibbs free energy value above 500° C. Thus the regeneration reaction of reacted manganese oxide should be thermodynamically feasible. It should be noted that most metal oxides form stable metal chlorides with hydrogen chloride and are not regenerable. Manganese oxide is unique that the manganese chloride reacts with oxygen to form manganese oxide.

Hydrogen Chloride Sorption Tests with Thermogravimetric Analysis

Manganese oxide (MnO) powder was tested in a thermo gravimetric analyzer (TGA). The MnO was placed in the TGA and was heated to 315° C., 400° C. and 500° C. under nitrogen at 90 cc/min. Then a gas mixture consisting of 0.1 vol. % HCl, 39% $H_2$ and nitrogen was introduced to the sample for 8 hours. After the chlorination cycle was completed the sample was heated to 700° C. and air was introduced for 275 minutes. Solid samples were collected at various stages of the reaction and total chlorine analysis was conducted on the solid sample using wet chemical methods. The solid sample analysis was conducted both at NETL/U.S. department of Energy laboratory and at Galbraith laboratories Inc. The samples were also analyzed utilizing scanning electron microscopy/Energy dispersive analysis (SEM/EDS) and X-ray photoelectron spectroscopy (XPS). SEM/EDS shows the chloride analysis near the surface while the XPS shows the Cl/Mn atomic ratio at the top surface (<50 A). The solid analysis data at various stages of the reaction during a ten cycle test at 500° C. are shown in Table 1.

TABLE 1

Chloride Analysis During Multi Cycle Tests
(500° C. chlorination & 700° C. regeneration)

| No. of Cycles | Total Chloride (wt %) | Chloride by SEM/EDS | Surface Cl/Mn by XPS |
|---|---|---|---|
| 0.5 (sorption) | 13.26 | Detected | 1.5 |
| 1.0 (Regeneration) | 0.01 | 0 | 0.1 |
| 1.5 (sorption) | 19.86 | Detected | 1.5 |
| 2.0 (Regeneration) | 0.01 | 0 | 0.1 |
| 9.5 (sorption) | 12.16 | Detected | 1.8 |
| 10.0 (Regeneration) | 0.01 | 0 | 0.1 |

As shown in Table 1, during chlorination cycles the (0.5, 1.5 and 9.5 cycles) chlorine was detected. During regeneration cycles (1.0, 2.0, and 10.0 cycles) chlorine was not detected. The data obtained by total chlorine analysis using wet chemical methods, SEM analysis and XPS analysis were very consistent. The data confirmed that the sorbent can capture hydrogen chloride and it is regenerable.

The results of the total chloride analysis by wet chemical methods after the chlorination reaction conducted at all three temperatures (315°, 400° and 500° C.) and regeneration reaction conducted at 700° C. are shown in Table 2.

TABLE 2

Analysis of Chloride in the solid samples after reactions at various temperatures

| Cycle No. | 315° C. | 400° C. | 500° C. |
|---|---|---|---|
| 0.5 (sorption) | 5.7 | 10.4 | 16.8 |
| 1.0 (Regeneration) | 0.02 | 0.01 | 0.02 |
| 1.5 (sorption) | 5.9 | — | — |
| 2.5 (sorption) | — | 12.3 | 11.4 |
| 9.5 (sorption) | 6.5 | 17.0 | 19.1 |
| 10.0 (Regeneration) | 0.02 | 0.02 | — |
| 10.5 (sorption) | — | — | 19.4 |
| 0.5 (G 92 C disposable sorbent from Sud Chemie) | 10.8 | 10.2 | 5.0 |

The data in Table 2 indicated that the material can absorb HCl at 315°-500° C. and could be regenerable. The amount of HCl uptake is very similar (or better) to the HCl uptake of the non regenerable commercial sorbent (G 92C) obtained from Sud Chemie as also shown in Table 2.

X-Ray diffraction analysis conducted on the material after reaction indicated the presence of various oxidation states of manganese in the oxides after regeneration.

Bench-Scale Flow Reactor Tests with Hydrogen Chloride Sorbents

The sorbent pellets (2-3 mm) utilizing MnO were prepared for the bench scale flow reactor tests. Following procedure was utilized for the preparation of the pellets.

| | |
|---|---|
| Manganese oxide | 400 grams |
| Bentonite | 80 grams |
| Drierite | 28 grams |

The powders were mixed in a mixer pelletizer and sufficient water was gradually added to make 2-3 mm pellets. The sorbent was heated in the oven at 100° C. for one hour and then at 400° C. for 2 hours.

Sorbent pellets were tested in a bench-scale quartz flow reactor. The reactor is a 2-inch diameter reactor with a 3-6-inch sorbent bed height. Components of the other parts of the reactor were made with a special alloy material to avoid reaction with HCl. A continuous flow ion mobility spectrometry detector system was utilized to measure the concentration of HCl and chlorine at the outlet of the reactor and the detector was calibrated to measure HCl levels to less than 500 ppb-level detection.

Figure 1:
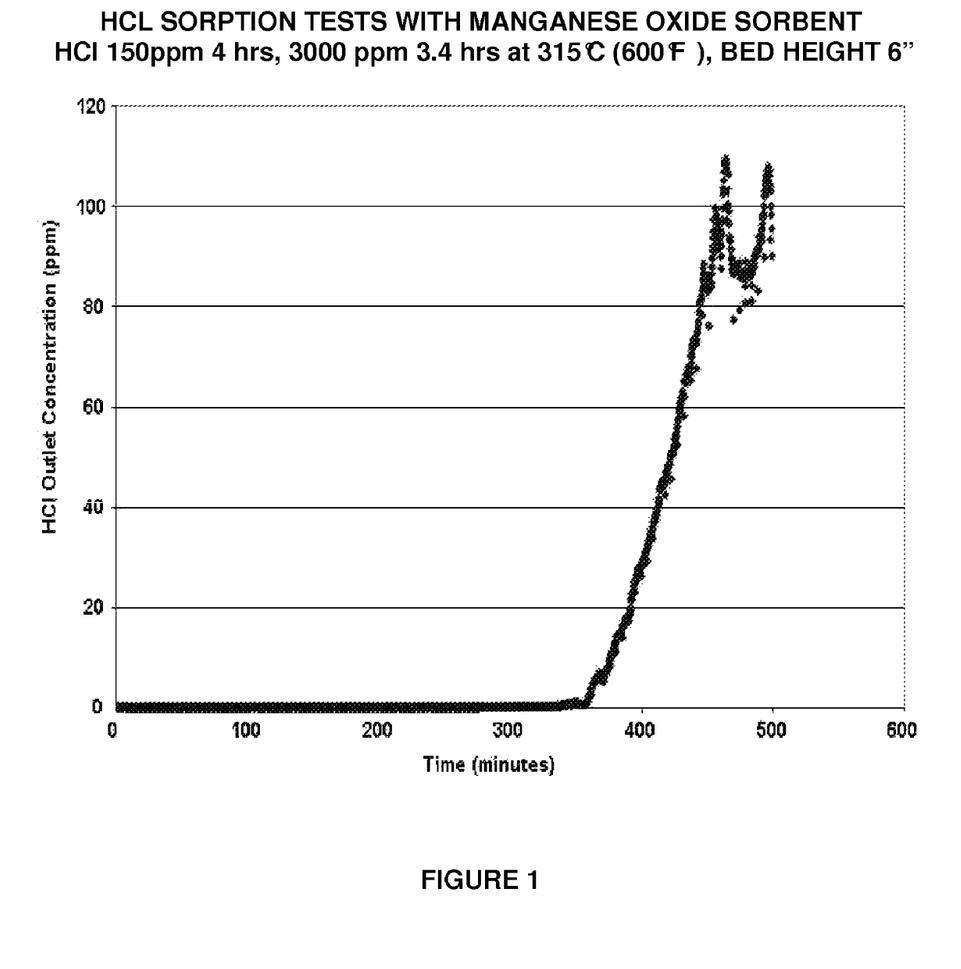
FIG. 1 is a graph of the Concentration of HCl as a Function of Time During the half-Cycle Bench Scale Flow Reactor Test at 315° C. (Inlet Concentration of HCl—150 ppm and 3000 ppm after 4 hours)
Figure 2:
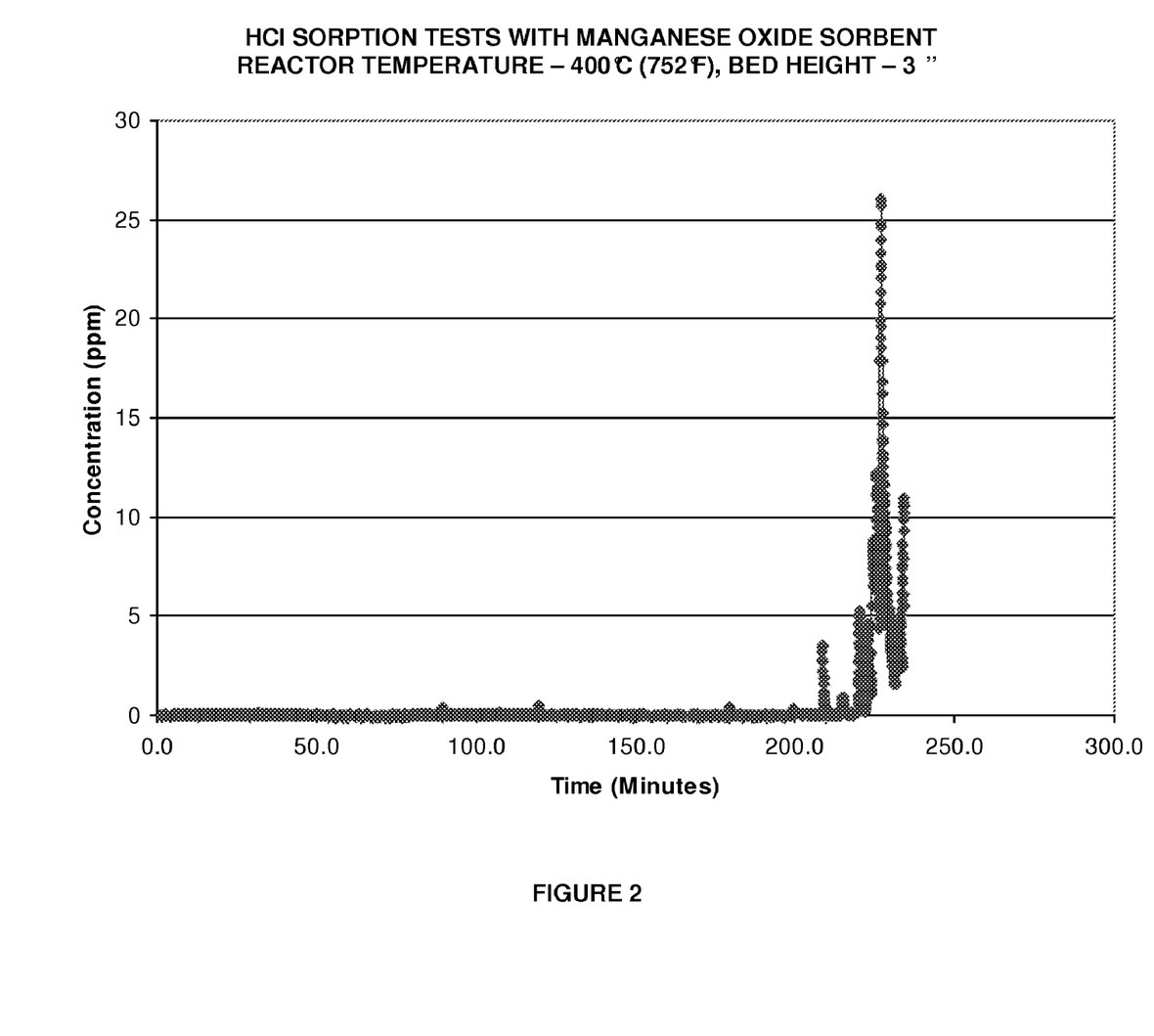
FIG. 2 is a graph of the Concentration of HCl as a Function of Time during the half-Cycle Bench Scale Flow Reactor Test at 400° C. (Inlet Concentration of HCl—150 ppm and 3000 ppm after 4 hours)
Figure 3:
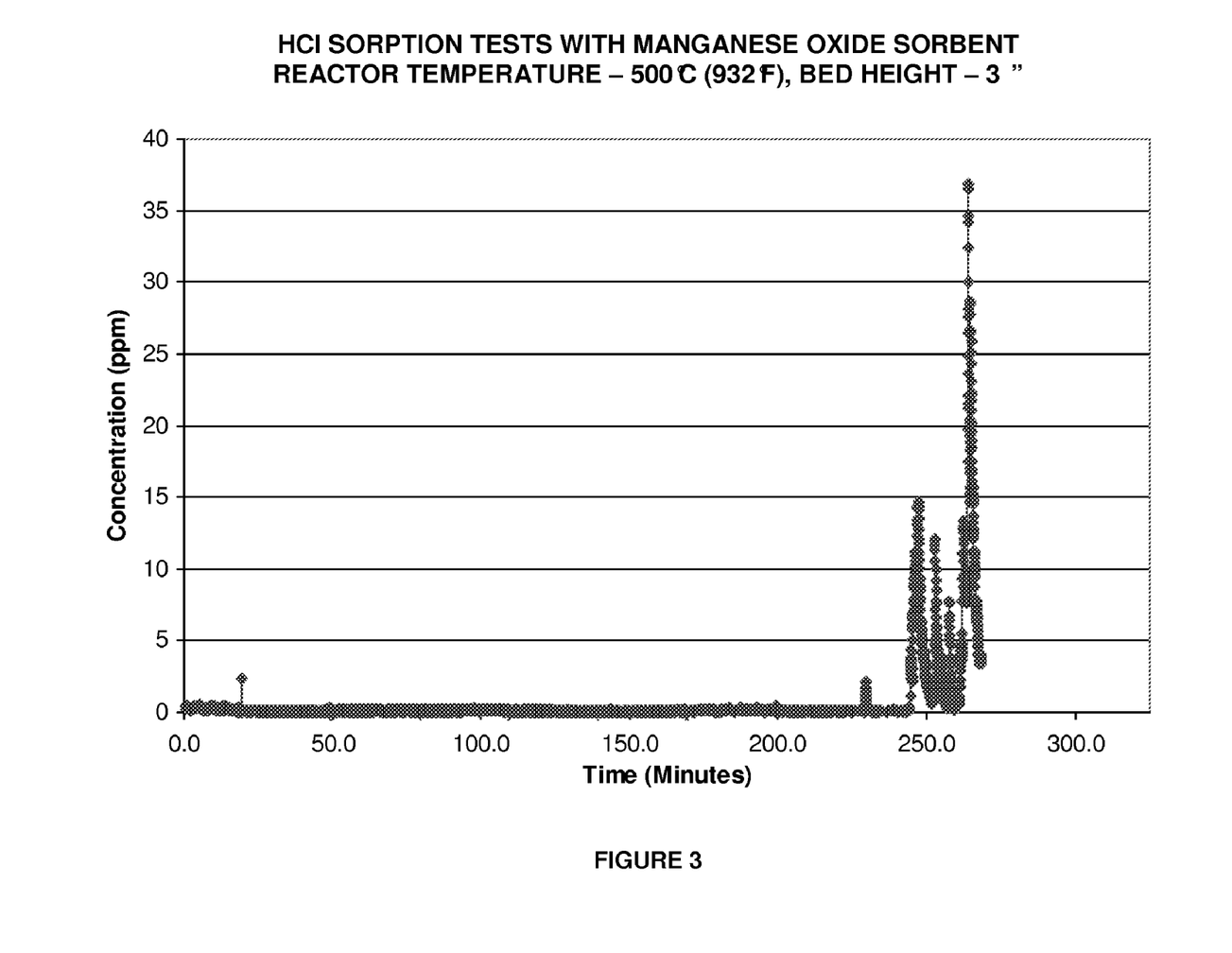
FIG. 3 is a graph of the Concentration of HCl as a Function of Time during the half-Cycle Bench Scale Flow Reactor Test at 500° C. (Inlet Concentration of HCl—150 ppm and 3000 ppm after 4 hours)

The sorbent bed had a weight of 245.8 g; it was heated to 315° C., 400° C., and 500° C. and pressurized to 25 psig. The simulated IGCC gas mix utilized for chlorination cycles contained 18 percent by volume (vol. %) Nitrogen, 13 percent Carbon dioxide, 38 percent Carbon monoxide, and 30.8 percent Hydrogen, mixed with HCl. During the one-cycle tests the sorbents were exposed to a gas mix with 150 ppm HCl for 4 hours at 315° C. Then the HCl concentration was increased to 3000 ppm. The results of the half cycle tests conducted at 315° C.; 400° C. and 500° C. are shown in FIGS. 1, 2, and 3. The results indicated that the sorbent can remove HCl to less than 1 ppm at 315° C., 400° and 500° C.

Figure 4:
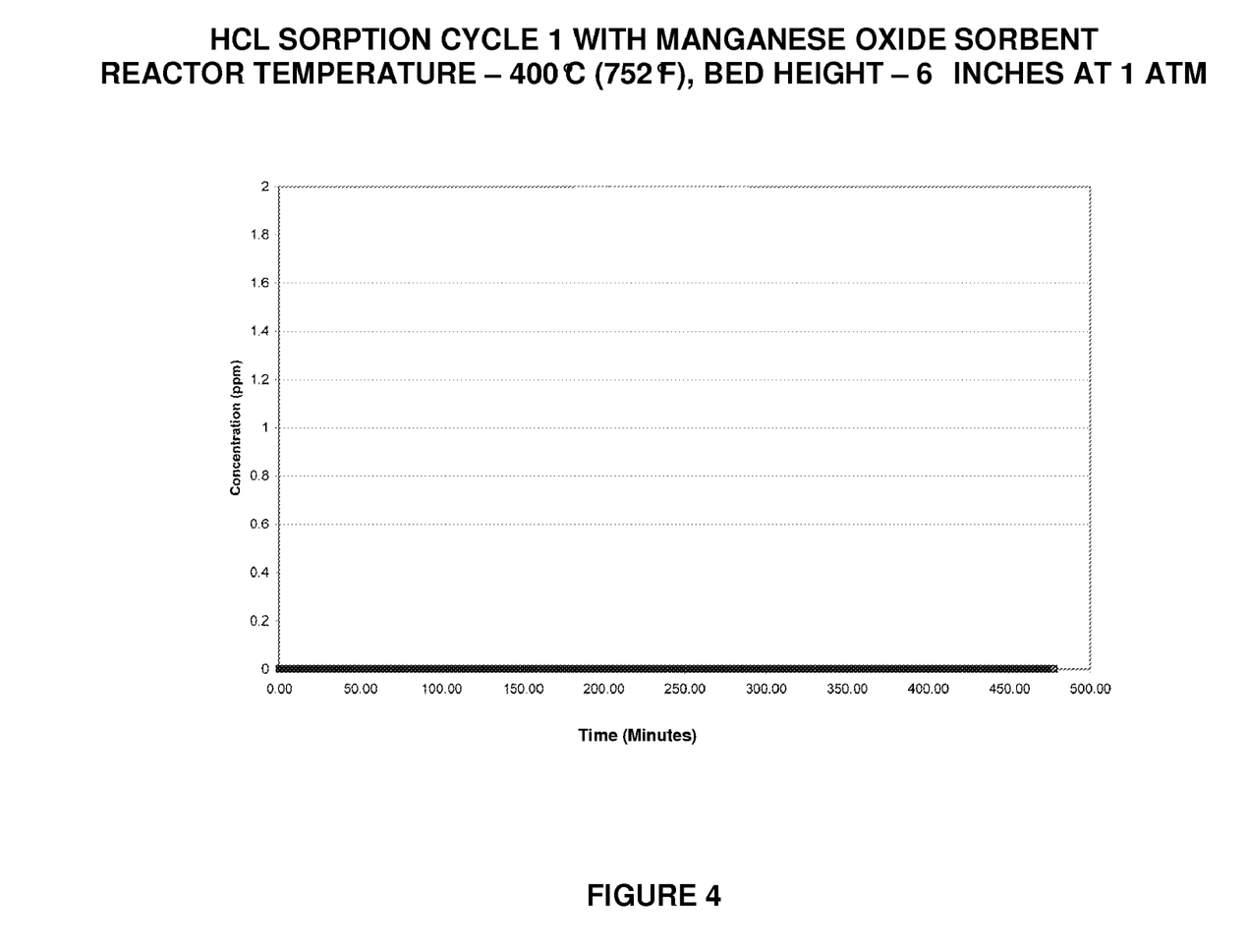
FIG. 4 is a graph of the Concentration of HCl as a Function of Time during the atmospheric 5-Cycle Bench Scale Flow Reactor Test at 400° C. (Inlet Concentration of HCl—150 ppm and 3000 ppm after 4 hours)

A five cycle test was conducted at 400° C. to establish the regenerability of the sorbent. The test conditions utilized during the five-cycle test were similar to that of the one-cycle tests. However, during the first four cycles, 150 ppm HCl was introduced for 8 hours at 400° C. and the sorbent was regenerated. For cycle 5, after exposing the sorbent for 150 ppm of HCl for 8 hours, the HCl concentration was increased to 3000 ppm and the reaction with HCl was continued for an additional 4 hours. The outlet concentration of HCl during a typical absorption cycle during the 5-cycle test, when the inlet concentration of HCl was 150 ppmv is shown in FIG. 4. The HCl removal efficiency was less than 1 ppm (less than 500 ppb a major portion of the times) during all the cycles but occasional HCl spikes were observed. The reason for the HCl spikes was not clear but may be due to the desorption of HCl retained on the unit from prolonged use of the reactor unit during previous tests.

Figure 5:
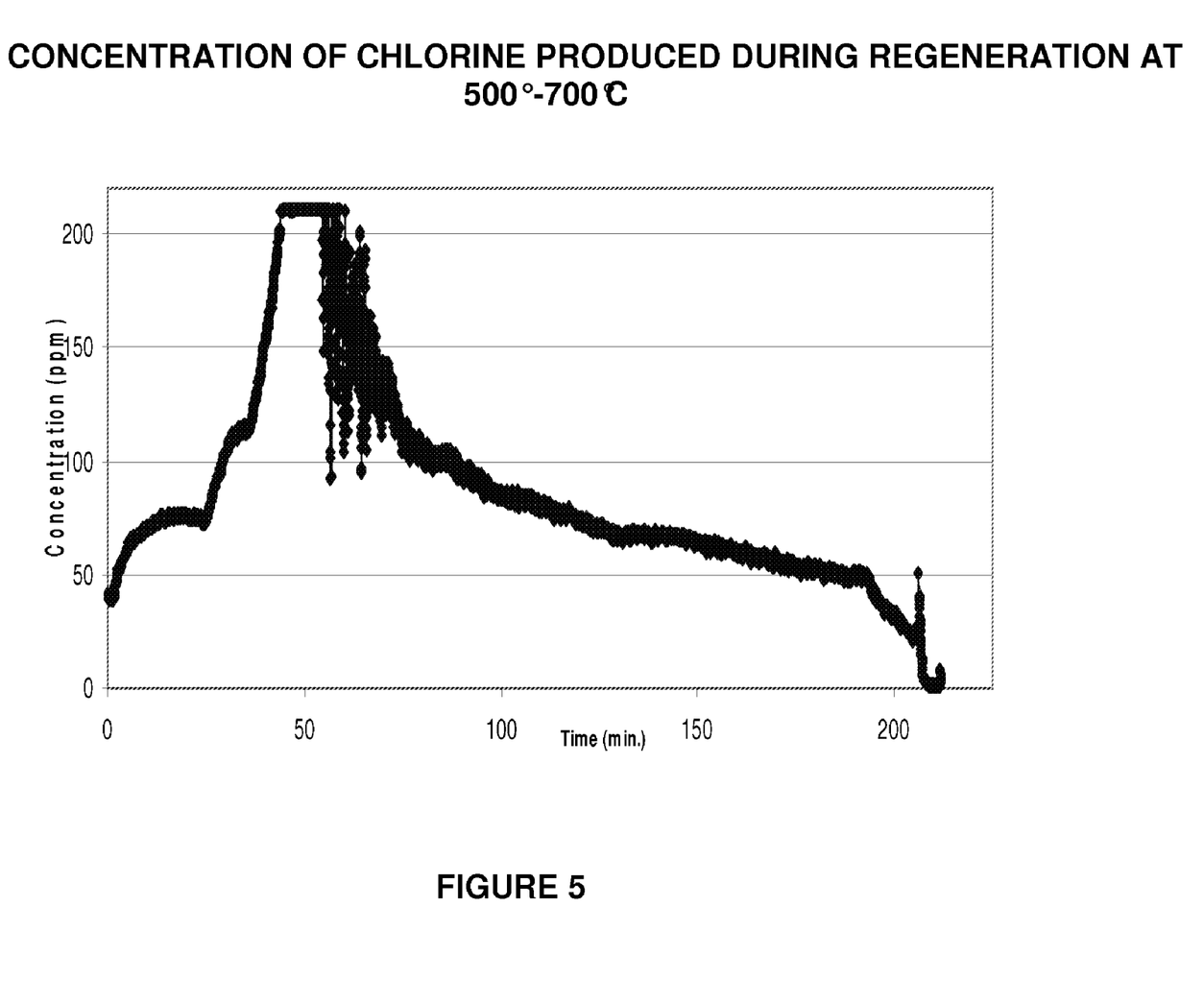
FIG. 5 is a graph of Chlorine Concentration as a Function of Time during Sorbent Regeneration at one atmosphere after HCl sorption at one atmosphere.
Figure 6:
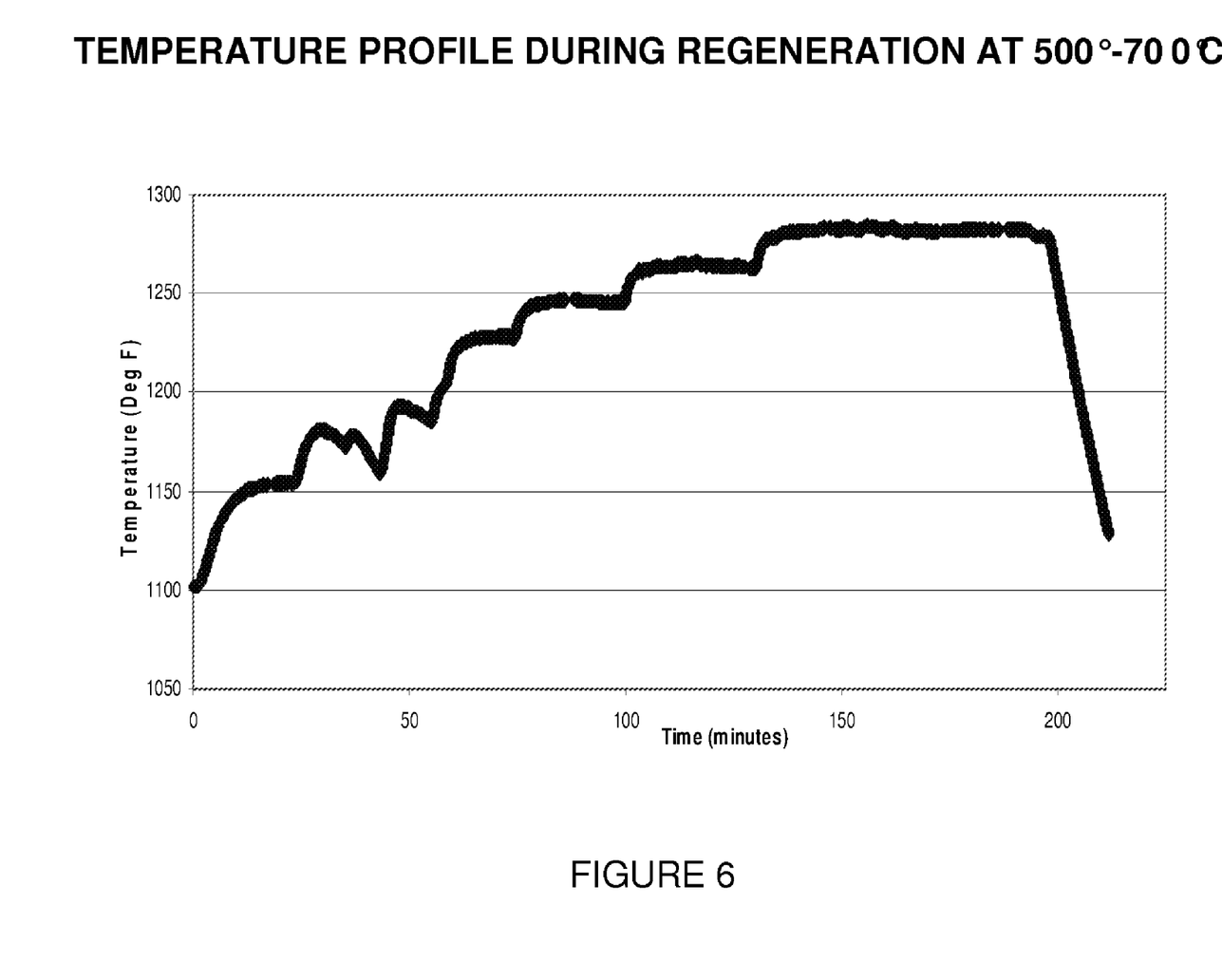
FIG. 6 is a graph of temperature profile as a Function of Time during Sorbent Regeneration at one atmosphere.

Regeneration was performed starting at 500° C., at 25 psig, with three percent oxygen in nitrogen, with a space velocity of 2,000 h$^{-1}$. After each cycle during the five-cycle test, regeneration was performed with oxygen. The initial regeneration temperature was 500° C., but the temperature of the reactor bed increased to about 70° C. The oxidative regeneration was started with 1.0 vol. % of oxygen and increased to three percent by the end of the regeneration cycle. Total regeneration time was approximately 180 minutes. Oxygen was fully consumed during regeneration cycle. Chlorine was detected during regeneration as shown in FIG. 5. The regeneration temperature profile is shown in FIG. 6. Thus, the flow reactor test data confirmed that the sorbent is regenerable as was also observed during the TGA tests. The temperature during the regeneration increased due to exothermic reaction. The sorbent performed well during the five-cycle test. The sorbent was able to remove the HCl from 150 ppm to less than 1.5 ppm during the tests. In majority of the cycles the removal efficiency was less than 500 ppb.

Figure 7:
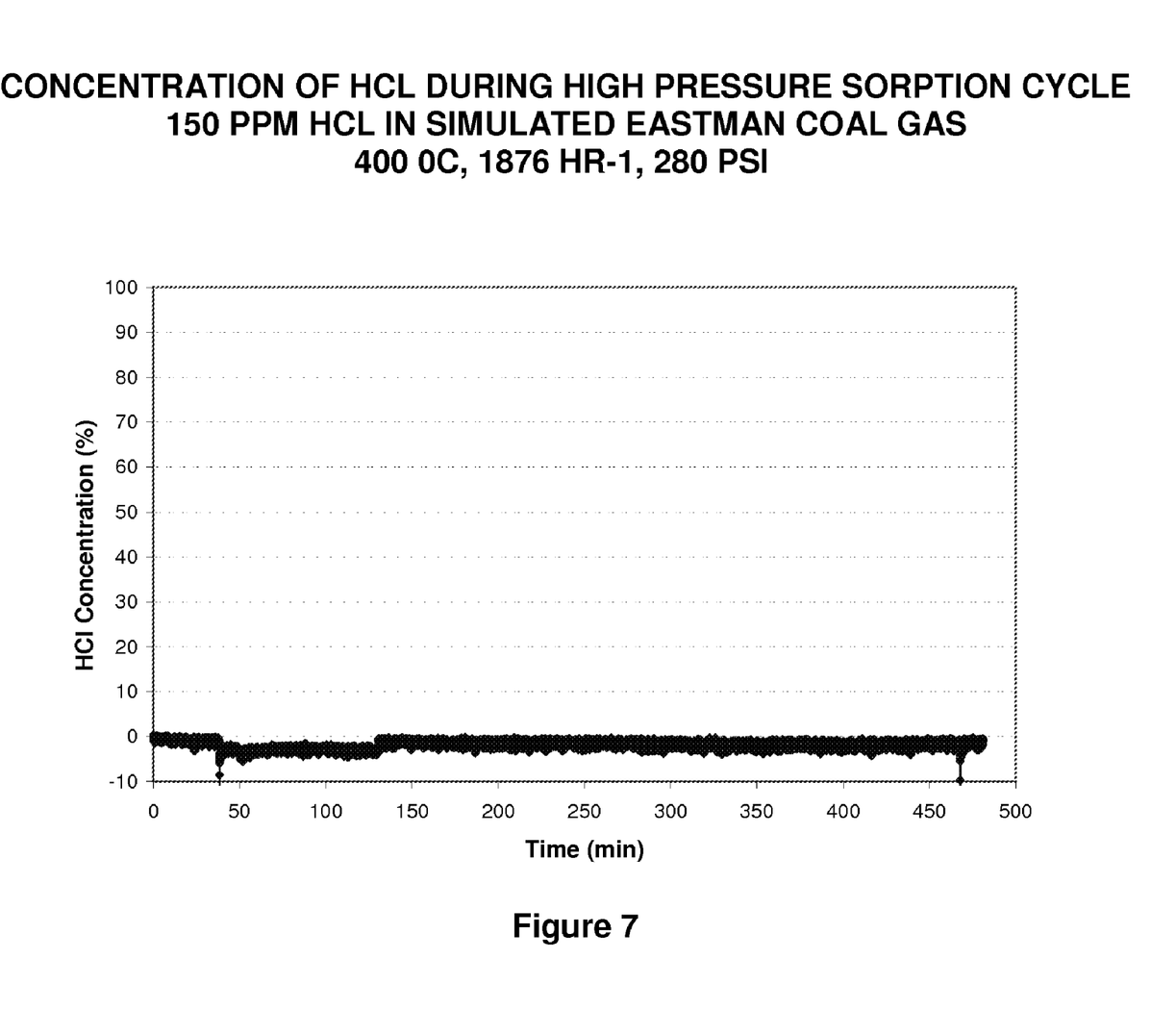
FIG. 7 is a graph of Concentration of HCl during high pressure sorption cycle in a bench flow reactor test (Inlet gas composition: 150 ppm HCl in simulated Eastman coal gas 400° C., 1876 hr-1, 280 psi)
Figure 8:
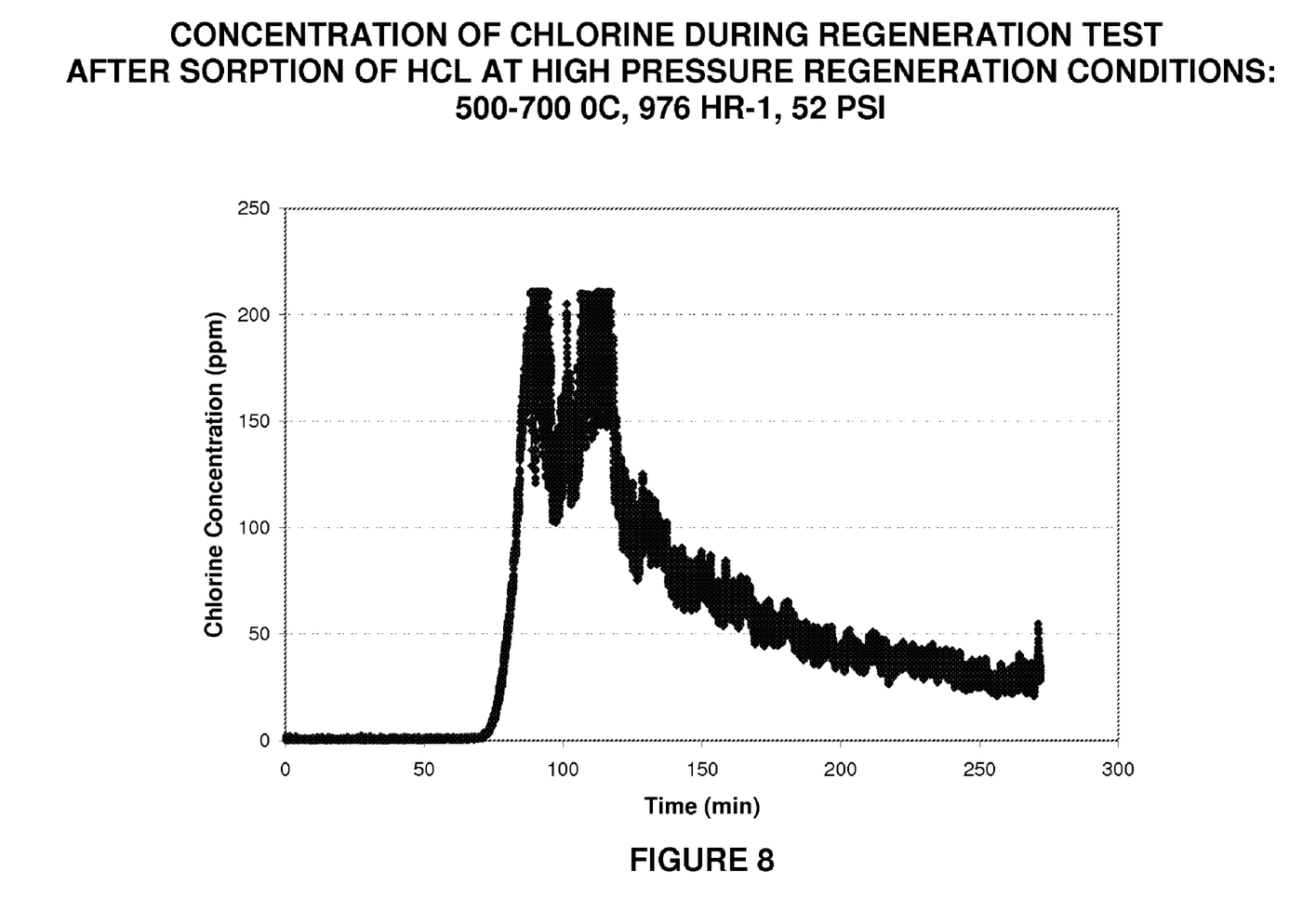
FIG. 8 is a graph of the Concentration of chlorine during regeneration test after high pressure sorption cycle (Regeneration test condition—500°-700° C., 976 hr-1, 52 psi).

Bench scale flow reactor tests with the MnO sorbent were also conducted at high pressure. The simulated IGCC gas mix utilized for chlorination cycles contained 18 percent by volume (vol. %) Nitrogen, 13 percent Carbon dioxide, 38 percent Carbon monoxide, and 30.8 percent Hydrogen, mixed with 150 ppm HCl. The absorption cycle was conducted at 400° C. and at 280 psi with a space velocity of 1876 hr-1 for 8 hours. Regeneration was performed with 2-3% oxygen at 976 hr-1 space velocity and at 52 psi. The initial regeneration temperature was 500° C., but the temperature of the reactor bed increased to about 700° C. during regeneration due to exothermic reaction. The results of the absorption cycle during high pressure bench scale test is shown in FIG. 7 and the HCl removal efficiency was near zero during the absorption. Chlorine was observed during regeneration as shown in FIG. 8 and this indicated that the sorbent is regenerable after high pressure HCl capture.

Reaction of Sorbent with Both HCl and H$_2$S Multi Functional Sorbent

Manganese oxide has an ability to also absorb H$_2$S and therefore can be utilized as a multi-functional sorbent to capture both H$_2$S and HCl. TGA tests were conducted to determine the multi functional ability of the sorbent to capture both H$_2$S and HCl. Separate TGA tests were conducted with gas mixtures consisting of 300 ppm HCl in synthesis gas and 4000 ppm H$_2$S in synthesis gas. The synthesis gas consisted of CO-38%, H$_2$—31%, CO$_2$—13% and He. Flow rate of gas was 90 cc/min during the TGA tests. Then the gases were combined to obtain a mixture containing both 150 ppm HCl and 2000 ppm H$_2$S in synthesis gas. Then the sorbent was introduced to the gas mixture containing both H$_2$S and HCl. Regeneration was conducted at 700° C. with air. Solid analysis for chloride and sulfur was conducted after sorption (cycle 2.5) and regeneration (cycle 3.0) at Galbraith laboratories Inc. The results with pure manganese oxide and manganese oxide pellets containing bentonite and drierite are shown in Tables 3 and 4 respectively. Chloride and sulfur were observed after sorption (2.5) cycles and minimal amount of chloride and sulfur were observed after regeneration (3.0) cycles. When both H$_2$S and HCl were introduced simultaneously, absorption of both chloride and sulfur were observed and removal of these species were observed during regeneration as also shown in Tables 3 and 4. Results indicate that the sorbent can absorb H$_2$S and HCl simultaneously and can be regenerated with oxygen. Thus the sorbent has a multi functional use to remove both H$_2$S and HCl.

TABLE 3

TGA tests with manganese oxide utilizing both HCl and H$_2$S containing synthesis gas and solid analysis for chloride and sulfur Sorption at 400° C. and regeneration with air at 700° C.

| Number of cycles | H$_2$S and HCl Composition in syn gas | Solid analysis - Chloride | Solid analysis - Sulfur |
|---|---|---|---|
| Sorption cycle 2.5 | 4000 ppm H$_2$S | N.A. | 2.5% |
| Regen. cycle 3.0 | 4000 ppm H$_2$S/air | N.A. | <0.6% |
| Sorption cycle 2.5 | 300 ppm HCl | 954 ppm | NA |
| Regen. Cycle 3.0 | 300 ppm HCl/air | <125 ppm | NA |
| Sorption cycle 2.5 | 2000 ppm H$_2$S/150 ppm HCl | 964 ppm | 1.65% |
| Regen. Cycle 3.0 | 2000 ppm H$_2$S/150 ppm HCl/air | <111 ppm | <0.9% |

TABLE 4

TGA tests with manganese oxide sorbent pellets with bentonite
and drierite and solid analysis for chloride and sulfur
Sorption at 400° C. and regeneration with air at 700° C.

| Number of cycles | $H_2S$ and HCl Composition in syn gas | Solid analysis - Chloride | Solid analysis - Sulfur |
|---|---|---|---|
| Sorption cycle 2.5 | 150 ppm HCl | 0.25% | NA |
| Regen. Cycle 3.0 | 150 ppm HCl/air | 906 ppm | NA |
| Sorption cycle 2.5 | 2000 ppm $H_2S$/150 ppm HCl | 0.17% | 2.81% |
| Regen. Cycle 3.0 | 2000 ppm $H_2S$/150 ppm HCl/air | 286 ppm | 1.39% |

Alternative Versions and/or Uses of the Invention.

The sorbent can be used for any HCl removal process or simultaneous removal of both $H_2S$ and HCl. In addition to coal gasification, processes that involve either HCl removal or simultaneous HCl and $H_2S$ removal from gas streams such as land fill natural gas and fuel gas from bio mass gasification.

The regenerable sorbents for HCl removal are not reported in the literature. The HCl capture sorbent containing manganese oxide developed in this work is unique that it is regenerable. It is also unique that the MnO containing material can remove HCl at warm gas temperatures (315°-500° C.) and regenerable with oxygen at 700° C. making it suitable for coal gasification gas stream clean up systems. Since the sorbent is regenerable it will minimize the costs involved with land fills/disposal that will be encountered with the non-regenerable sorbents. It is also unique that the sorbent can simultaneously remove both $H_2S$ and HCl and can be regenerated. The sorbent can be operated at temperature from about 315° C. to about 700° C. making it suitable for either HCl or both HCl/$H_2S$ removal from warm/hot gas streams.

USE IN INDUSTRY

If gasification processes are to be successful all the contaminants in the gas stream have to be removed. HCl is one of the major contaminants and removal of HCl is critical. So the invention will have use in both government and industry. In addition the sorbent can be used as a multi functional sorbent to remove both $H_2S$ and HCl simultaneously from gas streams that will minimize the units necessary for gas clean up. Since the sorbent is regenerable it will minimize the disposal costs.

Although the invention has been described above in relation to preferred embodiments thereof, it will be understood by those skilled in the art that variations and modifications can be affected in these preferred embodiments without departing from the scope and spirit of the invention.

I claim:

1. A method of removing hydrogen chloride and hydrogen sulfide from a process gas stream comprised of the hydrogen chloride and the hydrogen sulfide using a regenerable manganese oxide sorbent comprising:

contacting the process gas stream with a sorbent comprised of a first manganese oxide at an absorption temperature, where the first manganese oxide is comprised of MnO, $MnO_2$, or mixtures thereof, such that some portion of the hydrogen chloride in the process gas stream reacts with some portion of the first manganese oxide to produce manganese chloride, and such that some portion of the hydrogen sulfide in the process gas stream reacts with a second some portion of the first manganese oxide to produce manganese sulfide, thereby removing the some portion of the hydrogen chloride and the some portion of the hydrogen sulfide from the process gas stream and producing a hydrogen chloride and hydrogen sulfide depleted gas stream, and thereby producing a loaded sorbent comprised of manganese chloride and manganese sulfide;

exhausting the hydrogen chloride and hydrogen sulfide depleted gas stream;

isolating the loaded sorbent from the process gas stream and the hydrogen chloride and hydrogen sulfide depleted gas stream and exposing the loaded sorbent to a regeneration atmosphere comprised of oxygen, and heating the loaded sorbent to a regeneration temperature such that some portion of the manganese chloride comprising the loaded sorbent reacts with some portion of the oxygen comprising the regeneration atmosphere to produce a second manganese oxide and a gaseous chlorine, where the second manganese oxide is comprised of MnO, $MnO_2$, or mixtures thereof, and such that some portion of the manganese sulfide comprising the loaded sorbent reacts with a second some portion of the oxygen comprising the regeneration atmosphere to produce a third manganese oxide and a gaseous sulfur dioxide, where the third manganese oxide is comprised of MnO, $MnO_2$ or mixtures thereof and where the regeneration temperature is a temperature such that the second manganese oxide and the gaseous chlorine are produced by a reaction having negative Gibbs free energy, thereby regenerating the loaded sorbent and producing a regenerated sorbent, where the regenerated sorbent is comprised of the second manganese oxide and the third manganese oxide;

isolating the regenerated sorbent from the regeneration atmosphere and the gaseous chlorine and the gaseous sulfur dioxide and cooling the regenerated sorbent to the absorption temperature; and repeating the contacting the process gas stream step using the regenerated sorbent comprised of the second manganese oxide and the third manganese oxide as the sorbent comprised of the first manganese oxide, thereby removing hydrogen chloride and hydrogen sulfide from the process gas stream comprised of hydrogen chloride and hydrogen sulfide using a regenerable manganese oxide sorbent.

2. The method of claim 1 wherein the absorption temperature is between about 200° C. and about 700° C.

3. The method of claim 2 wherein the absorption temperature is between about 300° C. and about 500° C.

4. The method of claim 1 where the regeneration temperature is greater than 500° C. and the regeneration atmosphere is comprised of at least 2 wt % oxygen.

5. The method of claim 1 where the regeneration atmosphere is further comprised of steam.

6. The method of claim 1 where the process gas stream is synthesis gas, the absorption temperature is from about 300° C. to less than 500° C., and the regeneration temperature is greater than 500° C. to about 700° C.

7. The method of claim 1 where the contacting the process gas stream with a sorbent comprised of a first manganese oxide at an absorption temperature is conducted in a first reaction chamber and the hydrogen chloride depleted gas stream is exhausted from the first reaction chamber, and where isolating the loaded sorbent from the process gas stream and the hydrogen chloride depleted gas stream and exposing the loaded sorbent to a regeneration atmosphere comprised of oxygen and heating the loaded sorbent to a regeneration temperature is conducted in a second reaction chamber, and where loaded sorbent is transferred from the first reaction chamber to the second reaction chamber, and regenerated sorbent is transferred from the second reaction chamber to the first reaction chamber.

8. A method of removing hydrogen chloride and hydrogen sulfide from a process gas stream comprised of the hydrogen chloride and the hydrogen sulfide using a regenerable dual purpose manganese oxide sorbent comprising:

contacting the process gas stream with a sorbent comprised of a first manganese oxide at an absorption temperature, where the first manganese oxide is comprised of MnO, $MnO_2$, or mixtures thereof, such that some portion of the hydrogen chloride in the process gas stream reacts with a first portion of the first manganese oxide to produce manganese chloride, and such that some portion of the hydrogen sulfide in the process gas stream reacts with a second portion of the first manganese oxide to produce manganese sulfide, thereby removing the some portion of the hydrogen chloride and the some portion of the hydrogen sulfide from the process gas stream and producing an acid depleted gas stream, and thereby producing a loaded sorbent comprised of manganese chloride and manganese sulfide;

exhausting the acid depleted gas stream;

isolating the loaded sorbent from the process gas stream and the acid depleted gas stream and exposing the loaded sorbent to a regeneration atmosphere comprised of oxygen, and heating the loaded sorbent to a regeneration temperature such that some portion of the manganese chloride comprising the loaded sorbent reacts with a first portion of the oxygen comprising the regeneration atmosphere to produce a second manganese oxide and a gaseous chlorine, and such that some portion of the manganese sulfide comprising the loaded sorbent reacts with a second portion of the oxygen comprising the regeneration atmosphere to produce a third manganese oxide and a sulfur dioxide, where the second manganese oxide and the third manganese oxide are comprised of MnO, $MnO_2$, or mixtures thereof, and where the regeneration temperature is a temperature such that the second manganese oxide and the gaseous chlorine are produced by a reaction having negative Gibbs free energy, thereby regenerating the loaded sorbent and producing a regenerated sorbent, where the regenerated sorbent is comprised of the second manganese oxide and the third manganese oxide;

isolating the regenerated sorbent from the regeneration atmosphere and the gaseous chlorine and the sulfur dioxide and cooling the regenerated sorbent to the absorption temperature; and repeating the contacting the process gas stream step using the regenerated sorbent comprised of the second manganese oxide and the third manganese oxide as the sorbent comprised of the first manganese oxide, thereby removing hydrogen chloride and hydrogen sulfide from the process gas stream comprised of the hydrogen chloride and the hydrogen sulfide using a regenerable dual purpose manganese oxide sorbent.

9. The method of claim 8 where the absorption temperature is between about 200° C. and about 700° C.

10. The method of claim 8 where the absorption temperature is between about 300° C. and about 500° C.

11. The method of claim 8 where the regeneration temperature is greater than 500° C. and the regeneration atmosphere is comprised of at least 2 wt % oxygen.

12. The method of claim 8 where the process gas stream is synthesis gas, the absorption temperature is from about 300° C. to less than 500° C., and the regeneration temperature is greater than 500° C. to about 700° C.

13. The method of claim 8 where the contacting the process gas stream with a sorbent comprised of a first manganese oxide at an absorption temperature is conducted in a first reaction chamber and the acid depleted gas stream is exhausted from the first reaction chamber, and where isolating the loaded sorbent from the process gas stream and the acid depleted gas stream and exposing the loaded sorbent to a regeneration atmosphere comprised of oxygen and heating the loaded sorbent to a regeneration temperature is conducted in a second reaction chamber, and where loaded sorbent is transferred from the first reaction chamber to the second reaction chamber, and regenerated sorbent is transferred from the second reaction chamber to the first reaction chamber.

14. The method of claim 8 where the regeneration atmosphere is further comprised of steam.

15. The method of claim 8 where the regeneration atmosphere is further comprised of steam.

16. A method of removing hydrogen chloride and hydrogen sulfide from a process gas stream comprised of the hydrogen chloride and the hydrogen sulfide using a regenerable dual purpose manganese oxide sorbent comprising:

contacting the process gas stream with a sorbent comprised of a first manganese oxide at an absorption temperature from about 300° C. to less than 500° C. in a first reaction chamber, where the first manganese oxide is comprised of MnO, $MnO_2$, or mixtures thereof, such that some portion of the hydrogen chloride in the process gas stream reacts with a first portion of the first manganese oxide to produce manganese chloride, and such that some portion of the hydrogen sulfide in the process gas stream reacts with a second portion of the first manganese oxide to produce manganese sulfide, thereby removing the some portion of the hydrogen chloride and the some portion of the hydrogen sulfide from the process gas stream and producing an acid depleted gas stream, and thereby producing a loaded sorbent comprised of manganese chloride and manganese sulfide;

exhausting the acid depleted gas stream from the first reaction chamber;

isolating the loaded sorbent from the process gas stream and the acid depleted gas stream and transferring the loaded sorbent to a second reaction chamber, and exposing the loaded sorbent to a regeneration atmosphere comprised of oxygen and heating the loaded sorbent to a regeneration temperature greater than 500° C. to about 700° C., such that some portion of the manganese chloride comprising the loaded sorbent reacts with a first portion of the oxygen comprising the regeneration atmosphere to produce a second manganese oxide and a gaseous chlorine, and such that some portion of the manganese sulfide comprising the loaded sorbent reacts with a second portion of the oxygen comprising the regeneration atmosphere to produce a third manganese oxide and a sulfur dioxide, where the second manganese oxide and the third manganese oxide are comprised of MnO, $MnO_2$, or mixtures thereof, and where the regeneration temperature is a temperature such that the second manganese oxide and the gaseous chlorine are produced by a reaction having negative Gibbs free energy, thereby regenerating the loaded sorbent and producing a regenerated sorbent, where the regenerated sorbent is comprised of the second manganese oxide and the third manganese oxide;

isolating the regenerated sorbent from the regeneration atmosphere and the gaseous chlorine and the sulfur dioxide, cooling the regenerated sorbent to the absorption temperature, and transferring the regenerated sorbent to the first reaction chamber; and repeating the contacting the process gas stream step using the regenerated sorbent comprised of the second manganese oxide and the third manganese oxide as the sorbent comprised of the first manganese oxide, thereby removing hydrogen chloride and hydrogen sulfide from the process gas stream comprised of the hydrogen chloride and the hydrogen sulfide using a regenerable dual purpose manganese oxide sorbent.

\* \* \* \* \*